US007114170B2

(12) United States Patent
Harris et al.

(10) Patent No.: US 7,114,170 B2
(45) Date of Patent: Sep. 26, 2006

(54) METHOD AND APPARATUS FOR PROVIDING INTERACTIVE MEDIA PRESENTATION

(75) Inventors: Doug S. Harris, Arlington, TX (US); Craig M. Templin, Grandbury, TX (US)

(73) Assignee: Neoris USA, Inc., Miami, FL (US)

( * ) Notice: Subject to any disclaimer, the term of this patent is extended or adjusted under 35 U.S.C. 154(b) by 1136 days.

(21) Appl. No.: 10/068,402

(22) Filed: Feb. 7, 2002

(65) Prior Publication Data

US 2002/0108109 A1  Aug. 8, 2002

Related U.S. Application Data

(60) Provisional application No. 60/267,111, filed on Feb. 7, 2001.

(51) Int. Cl.
*H04N 7/10* (2006.01)
*H04N 7/025* (2006.01)

(52) U.S. Cl. .............................. 725/34; 725/35; 725/61; 725/105; 725/114; 709/217; 709/219

(58) Field of Classification Search .................. 725/32, 725/34, 35, 52, 60, 61, 91, 105; 705/10, 705/26; 709/204, 206, 217, 219
See application file for complete search history.

(56) References Cited

U.S. PATENT DOCUMENTS

| | | | |
|---|---|---|---|
| 5,553,221 A | | 9/1996 | Reimer et al. |
| 5,873,022 A | | 2/1999 | Huizer et al. |
| 5,982,445 A | | 11/1999 | Eyer et al. |
| 6,128,712 A | | 10/2000 | Hunt et al. |
| 6,539,548 B1 * | 3/2003 | Hendricks et al. ........... 725/109 |
| 6,718,551 B1 * | 4/2004 | Swix et al. ................... 725/32 |
| 6,966,065 B1 * | 11/2005 | Kitazato et al. ............. 725/116 |
| 2002/0104086 A1 * | 8/2002 | Tomsen et al. ............... 725/42 |
| 2002/0166119 A1 * | 11/2002 | Cristofalo ..................... 725/34 |

FOREIGN PATENT DOCUMENTS

JP  2000-013775 A  1/2000

OTHER PUBLICATIONS

Thomas Meyer-Boudnik and Wolfgang Effelsberg, "MHEG Explained", IEEE Multimedia, IEEE Service Center, Mar. 21, 1995, pp. 26-38, vol. 2, No. 1, New York, New York, USA.

(Continued)

*Primary Examiner*—Ngoc Vu
(74) *Attorney, Agent, or Firm*—Sidley Austin LLP

(57) ABSTRACT

A method and system for presenting interactive and non-interactive media content to a client computer over a computer network. The system can combine discrete, continuous and interactive media into a single scene that is presented to the client computer. The system allows the presentation to be highly configurable and may therefore customize the presentation for a specific user. User profile information may be stored in an repository associated with the system. This information may be used to customize the presentation to suit the specific needs of a user or to notify the user when a presentation of interest to the user is available. Furthermore, information about a user's interaction with a particular presentation may be stored in the repository so that a presentation can adapt "on-the-fly" to suit the specific needs of a user. In addition, information regarding web services that are available on the Internet may be integrated with other interactive content in a presentation that is provided to a user. The system and method may also utilize an open-source computing platform so that presentations can be transmitted and displayed on a wide variety of client terminals.

57 Claims, 11 Drawing Sheets

OTHER PUBLICATIONS

John Buford and Chetan Gopal, "Delivery of MHEG-5 in a DAVIC ADSL Network", ACM Multimedia, 97, Nov. 9, 1997, pp. 75-85, Seattle, Washington, USA.

A. Kraft and R. Stolp, "MHEG-5 für das digitale Fernsehen", FKT Fernseh und Kinotechnik, Fachverlag Schiele & Schon GmbH, vol. 52, No. 12, Dec. 1998, pp. 714-716, 718-721, Berlin, Germany.

* cited by examiner

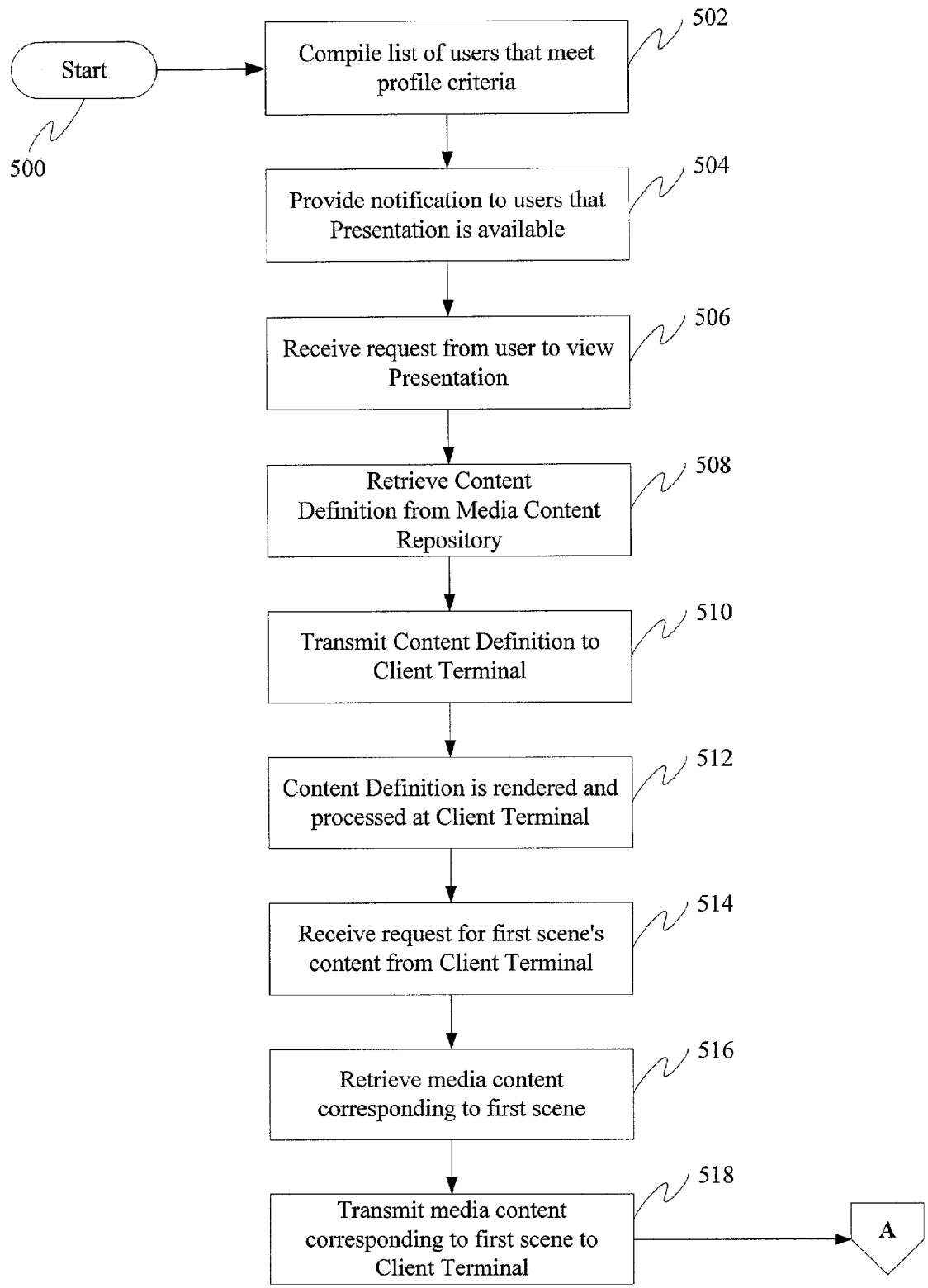

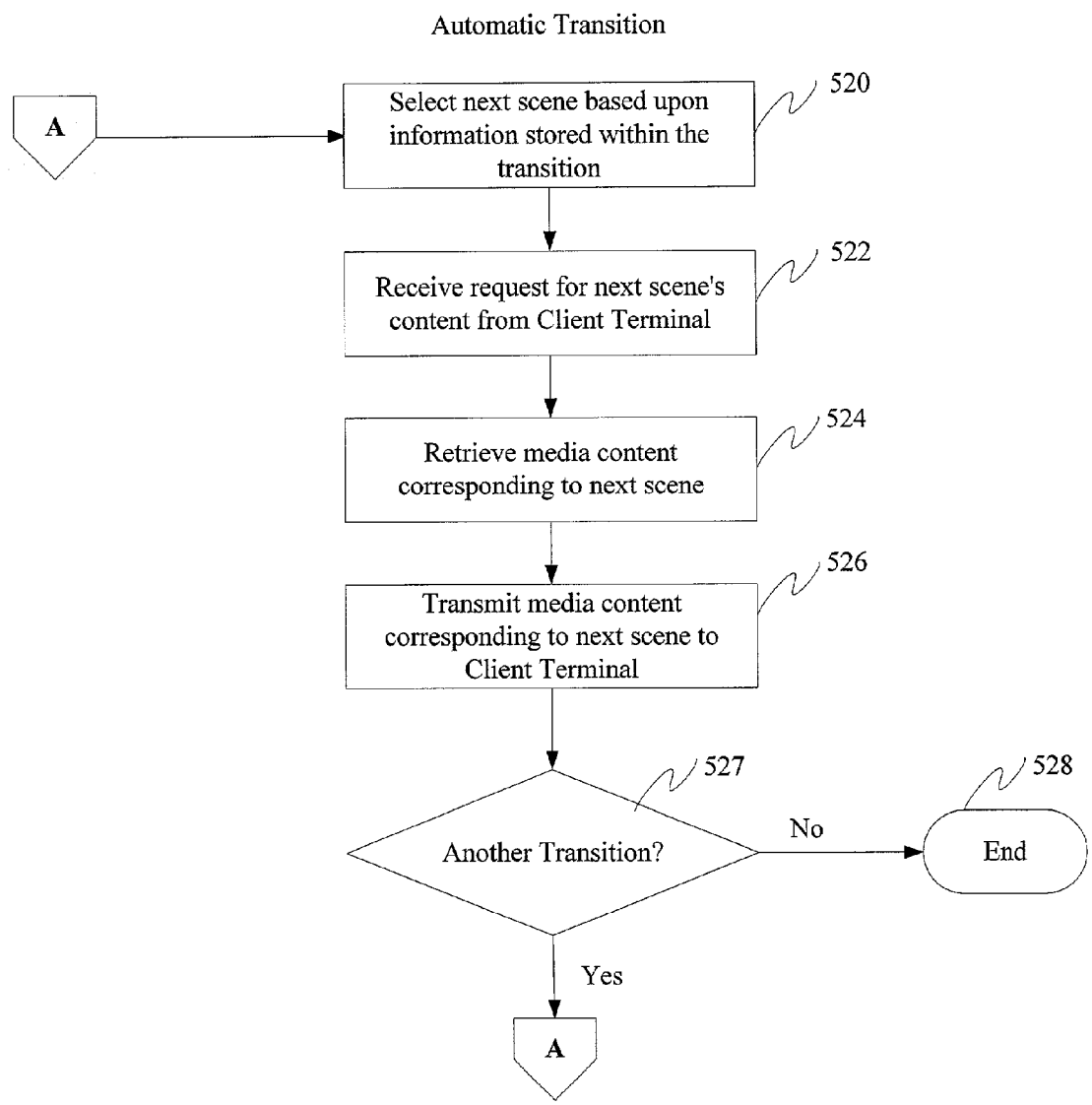

User-Profile Driven Transition

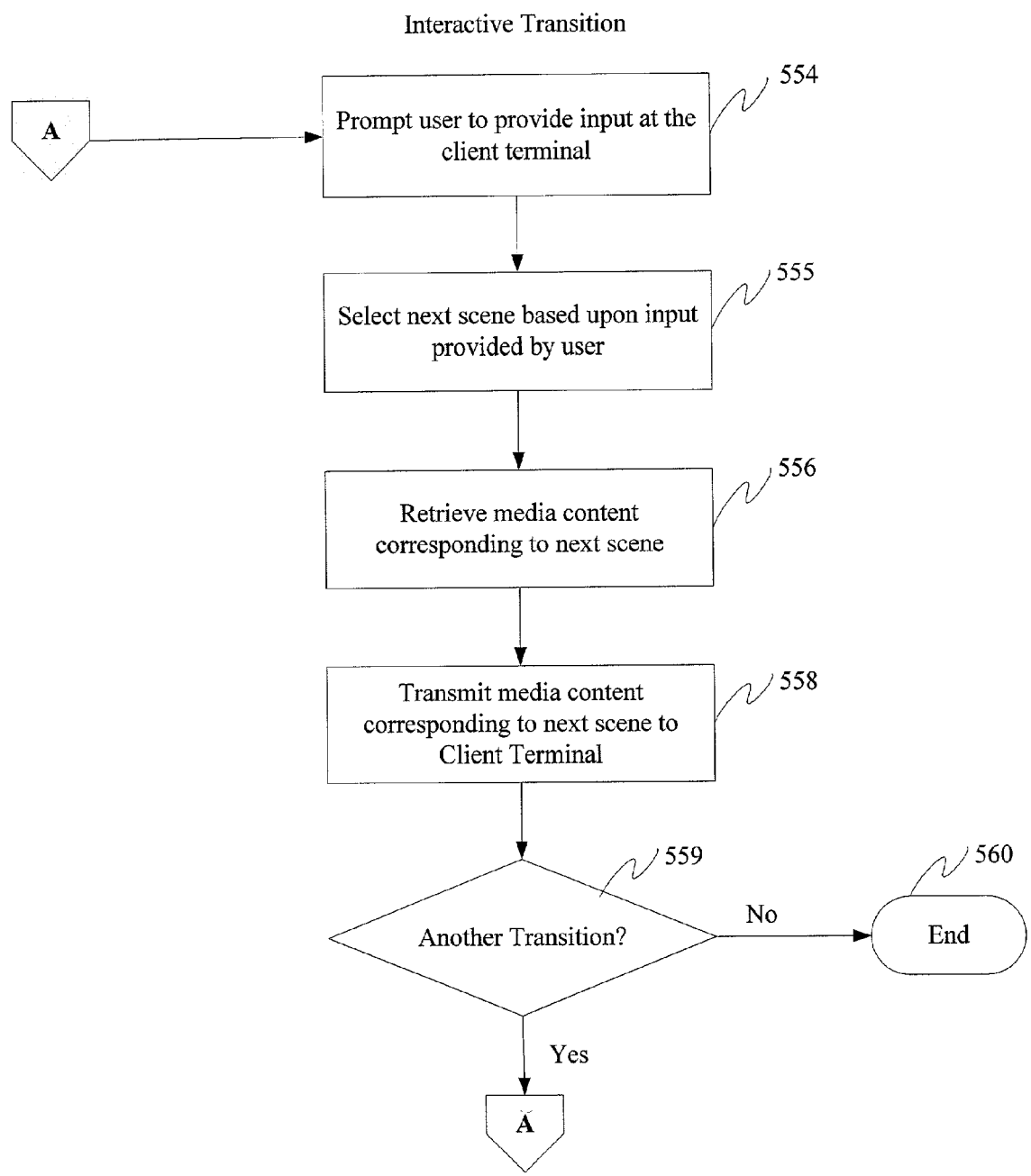

METHOD AND APPARATUS FOR PROVIDING INTERACTIVE MEDIA PRESENTATION

CROSS REFERENCE TO RELATED APPLICATION(S)

This application claims priority to provisional patent application No. 60/267,111 entitled "Interactive Television," which has a filing date of Feb. 7, 2001 and is incorporated by reference into this application.

BACKGROUND

The television viewing experience has changed relatively little over the past fifty years. Today, television is still enjoyed through a passive viewing experience that is essentially non-functional beyond the one-way communication of audio/video. TV stimulates demand, but is unable to recognize or fulfill it. Conversely, the Internet can provide functionality to recognize and fulfill demand but does effectively little to stimulate it. The challenge lies in empowering the TV with the functionality to recognize and fulfill the demand that it stimulates, while not disrupting the simplicity, clarity, and excitement that makes the TV experience so popular.

Video game developers have already demonstrated the merits of infusing video with interactivity. This successful infusion proves that when the viewer interacts with video, and the video responds accordingly; the resulting effect is one that engages and immerses the audience to a much higher degree, yielding a dramatic improvement to the overall quality of the experience. Video games are engaging, simple and interactive—but are not functional or versatile outside their intended gaming purpose.

In recent years, businesses and educational institutions have learned the Internet (as accessed by the World Wide Web) has considerable limitations. With more than 600 billion web pages and 7.5 petabytes of information accessible, Internet users are well aware of the intense effort required to translate information into understanding. It is widely acknowledged that with a seemingly endless array of valuable services available, the overall customer desire to get "what you want, when you want it" on the Internet has been less than fulfilled. Undesirable experiences have offset the versatility and functionality of the web in the minds of many users. As evidenced by failing dot-coms, the initial excitement of the web has faded, and many users are bypassing otherwise valuable Internet-based services due to complex, confusing, and boring experiences. Online service providers must provide better experiences or watch customers leave.

Many benefits arise from enabling viewers to go beyond a passive viewing experience. The viewing experience is enhanced when viewers can react and respond to the impulses and inspirations triggered by the viewing experience. The ultimate solution leverages the characteristic strengths of the TV experience (simple, understandable, engaging) to negate the characteristic weaknesses of the typical web experience (complex, confusing, boring) and simultaneously delivering versatile, interactive functionality enabling people to do the things they want to do.

Recognizing the video-centric nature of TV as the driving force behind its success in delivering entertaining and understandable experiences, technology vendors are developing solutions to harness this power and apply it to create functional, interactive and versatile Internet-based applications that are simple, understandable and engaging. These solutions can be primarily placed into one of two categories: Interactive TV or Streaming Media.

Responding to the fact the penetration of TV is approximately twice that of Internet connectivity, numerous vendors have sought to empower TV viewers to interact with web pages on the TV through a set-top box. This approach makes it easier for a viewer to act on impulse inspired by video, and does enable the TV to become functional. Interactive TV solutions work by attaching a set-top box to a TV. Essentially this technology brings the functionality, versatility, and interactivity of an Internet-enabled PC to the TV, in some ways making the TV more "PC-like". This approach is useful for providing simple web services such as electronic program guides, video-on-demand, targeted advertising, and simple e-commerce.

For applications that are more complex, however, this approach has several disadvantages. First, the content and applications are platform specific and may be run only on certain platforms. Porting functionality and content to run on a PC or cell phone takes considerable effort. Second, the infrastructure provided by these interactive TV product vendors has been tuned and tweaked to succeed in delivering a limited number of high-demand applications. The infrastructure lacks the flexibility to provide a deployment platform for a wider range of applications that can access valuable Web Services. Third, while this approach brings functionality, versatility, and interactivity to the TV, a closer look at this approach reveals additional disadvantages. This experience works by shifting the viewer's attention from the understandable, engaging messages conveyed via the video to a web page reformatted for TV. Although this approach provides easier access to some of the same basic Internet functions, it solves none of the inherent problems noted above.

Streaming media vendors have evolved from providing streaming media solution components to providing integrated application platforms. These integrated application platforms can conduct commerce transactions, syndicate content, and provide advertising support integrating content delivery with personalization (profiles, tracking & reporting). Most commonly, though, these solutions are used to stream audio and video to a PC. In this capacity, this technology essentially brings the simple, understandable, and engaging messages of TV to the PC, in some ways making the PC more "TV-like."

The advantage of Streaming Media platforms is that it provides the components for building interactive, functional applications that are simple to use, understandable, and engaging via personalized interactive video. By using advanced compression algorithms, such as MPEG-4, these platforms are portable to many different platforms, including TV set-tops, cell phones, PDAs as well as PCs. The disadvantage of Streaming Media platforms is that the personalization and commerce provided is proprietary and unable to leverage investments and or data contained in existing profiling or customer relationship management systems. Furthermore, utilizing these platforms to access other Web Services requires additional development. Thus, the desired versatility and flexibility comes with considerable cost.

It is therefore desirable to provide web services, interactive media, and other information in a rich client front-end that is engaging and interactive for the user. It is also desirable to provide an interactive experience that can anticipate the user's needs based upon a user's preferences and make suggestions that would assist him/her in their on-line experience. It is further desirable for a system to custom-tailor an interactive presentation to a specific user's needs and present certain options that a user has expressed interest in. It would be further desirable for a system to be constructed using an open-source platform so that it may be exported to a wide variety of client platforms.

BRIEF SUMMARY

Disclosed herein is a system and method for providing multimedia presentations to users of computer systems. The system can combine discrete, continuous and interactive media as part of a single presentation so that a user's on-line experience is greatly enriched. The system is also designed to work with existing web services to as to enhance a user's experience when purchasing, ordering or reserving these services. For example, a web-page allowing a user to book flight reservations will be incorporated with other media such as a streaming video file describing the user's destination and a virtual agent that provides instructions to the user as he makes reservations.

Another aspect of the system and method is that it is highly configurable and may be custom-tailored to suit a particular user's interests. For example, a user may create a user profile in the system that contains various statistical and demographic information about the user. The system may use this information to select certain users to receive a notification that certain presentations are available. For example, a user may include an entry in his user profile that he has an interest in European travel. Thus, when a presentation is made available regarding this subject, all users expressing an interest will receive a notification that the presentation is available. Another aspect of configurability is that a presentation itself may be customized based upon information contained in the user profile. For example, a presentation may present a user with a variety of airline ticket choices when a user is selecting a destination and a travel date. If the user has selected certain preferred airlines in the user profile, then the system may only present ticket choices corresponding to these preferred airlines.

Because most presentations provided to the user are interactive, the content of a presentation and the order in which that content is presented to the user may be based upon input received from the user. For example, a presentation may include information about a variety of travel destinations, such as Europe, the Caribbean, Hawaii, and Colorado. But a user may only be interested in Hawaii. Thus, by selecting links related to Hawaii, the user only receives information related to that destination. The content related to other destinations will not be viewed by the user. Information corresponding to a user's input and information describing which presentations have been viewed by a user may also be stored in the user's profile. This data can be useful for customizing presentations and selecting the user for notification of other presentations. For example, a student may have used the system to view several presentations related to algebra tutoring. This fact would be stored in the user profile in the system. Thus, when a new presentation on this subject becomes available, the user would be notified of such. In addition, the user's answers to tutorial questions may also be stored within the user's profile. This information can be used by the presentation to provide additional questions and tutoring until the user has developed a master of the subject.

Another aspect of the system is that it preferably uses an open-source platform, such a Java, for the system processes. Use of an open-source platform makes it much easier for the system to communicate with a wide variety of computer equipment, such as personal computers, cellular telephones, interactive television set-top boxes, or personal digital assistants. Use of an open-source platform also facilitates communication between the system and web service systems connected to the Internet. The system may utilize open-source platforms or protocols such as Java/Java 2 Enterprise Edition (J2EE), Synchronized Multimedia Integration Language (SMIL), Form-based Data Collection (XForms), Document Formatting (XSL Formatting Objects), and Scalable Vector Graphics (SVG). All of these platforms are based upon and are interoperable with the Extensible Markup Language (XML). As a result, business, multimedia, & user interface objects compliant with these standards can be readily adopted for use in this system.

BRIEF DESCRIPTION OF THE DRAWINGS

FIG. 5a is a process flow diagram illustrating how a presentation is provided to a particular user on a client terminal.

FIG. 5b is a process flow diagram illustrating how an automatic transition is processed by the system.

FIG. 5e is a process flow diagram illustrating how an interactive transition is processed by the system.

DETAILED DESCRIPTION

Figure 1:
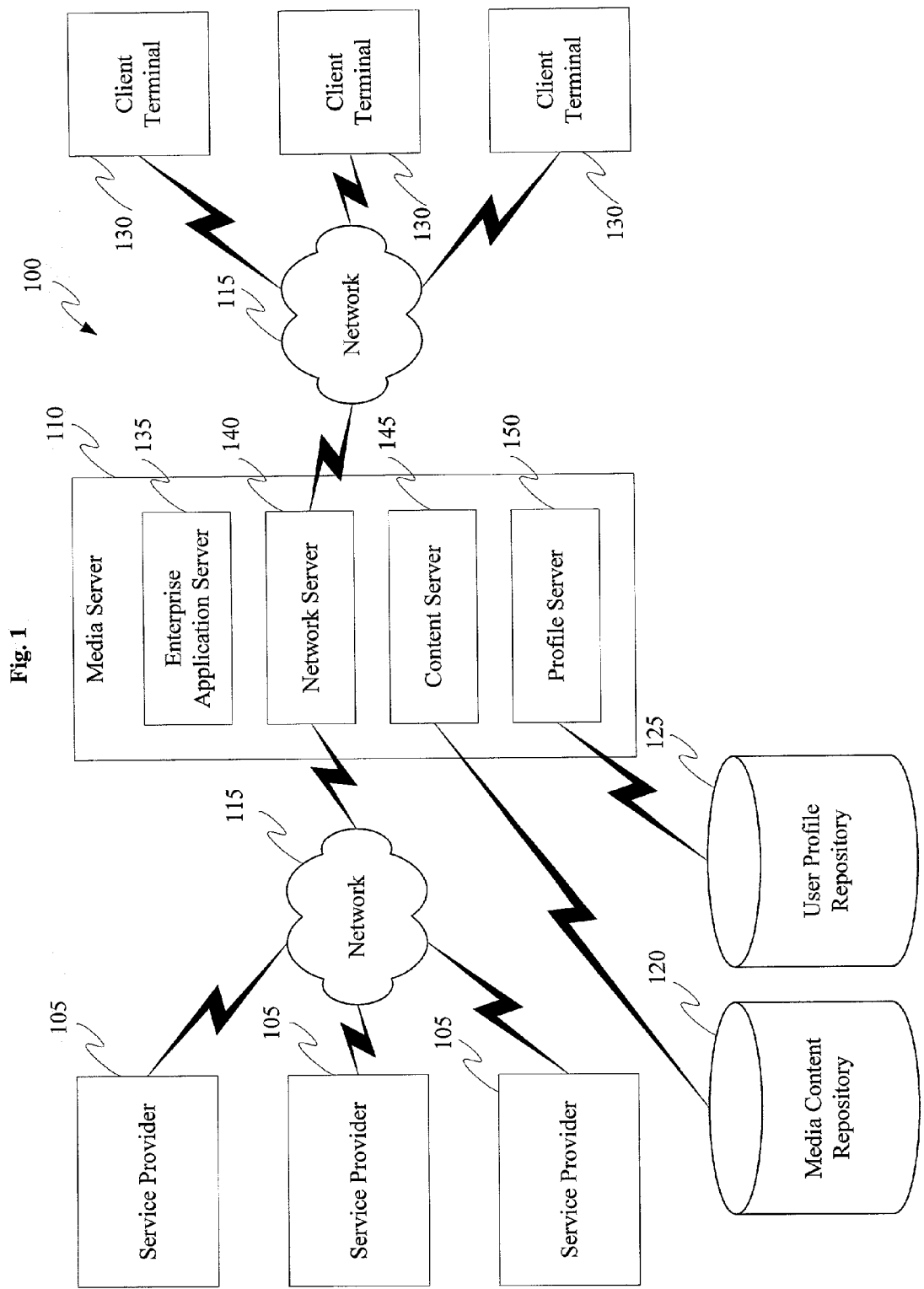
FIG. 1 is a block diagram of a computer system suitable for implementing the invention.

A block diagram of an interactive media system 100 suitable for use with the disclosed invention is depicted in FIG. 1. In FIG. 1, a plurality of service providers 105 are connected to a media server 110 through a computer network 115. Also connected to the media server 110 are a media content repository 120 and a user profile repository 125. A plurality of clients 130 may also be connected to the media server 110 through a computer network 115. The computer network 115 may be any network suitable for allowing communication between computers, such as an Ethernet connection, a local area network, a wide area network or the Internet. The service providers 105 may be any entity that provides web services over the Internet. For example, one service provider 105 could be an airline reservation website at which consumers can obtain information about flight schedules, fares, and ticket availability. Another service provider could be a hotel reservation website where a traveler can make reservations for a specific hotel room. Yet another possibility would be educational institution that posts the availability of certain classes or grade information on its website. All of these are web services that can be accessed and aggregated by the media server 110. At the other end, the client terminals 130 may be any of a wide variety of computer terminal, including personal computers, personal digital assistants (PDAs), cellular telephones, interactive television set-top boxes or any other kind of Internet appliance. These terminals 130 can communicate with the media server using a variety of open-source protocols, such as HTTP, XML, SMIL, or streaming media. Proprietary communications protocols, such as those used for proprietary set-top boxes, may also be used.

The media server 110 is generally considered to be comprised of four components: an enterprise application server 135, a network server 140, a content server 145 and a profile server 150. The enterprise application server 135 coordinates, manages, and distributes transactions across the different service providers 105 and provides session authentication, logging, and encryption management for each of the clients terminals 130 as they log onto the media server 110. The network server 140 is used to control the flow of information in and out of the media server 110 to the respective computer networks 115. The network server 140 is also used to ensure that data being sent to the client terminals 130 and to the service providers 105 is formatted in the appropriate protocol for each respective terminal. The content server 145 is used to manage, retrieve and store information that is stored in the media content repository 120. The profile server 150 is used to manage, retrieve and store information stored within the user profile repository 125.

With reference to FIG. 1, a typical communications session on the media server 110 is briefly described below. First, a user would use a client terminal 130 to connect to the media server 110. The enterprise application server 135 would validate the user's login information and grant him access to the media server 110. Upon connection to the server 110, the user may be presented with a variety of presentations or stories that can be viewed on the client terminal 130. The user selects one of the presentations or stories for viewing and the content server 145 retrieves a content framework corresponding to that presentation from the media content repository 120. The content framework is a skeleton of a presentation that describes how different elements (scenes) are assembled and presented to the user. The content framework also contains a series of logical operations (transitions) that describe the order and arrangement in which the scenes are to be presented to the user. The content framework further contains references to media files that are stored in the media content repository 120, information that is to be retrieved from a service provider 105, or information that is generally available from the Internet.

After the content framework is downloaded to the client terminal 130, it is executed by the client terminal 130. When the content framework is executed, the terminal 130 instructs the media server 110 to retrieve the referenced media content (either from the media content repository, a service provider, or the Internet in general) and present it to the user at the client terminal 130. In this manner, a wide variety of rich content is presented to the user through a single interface. Execution of the content framework also requires the client terminal 130 to process transitions. These transitions may be fully automated, in which case they will automatically select the next scene to be displayed. In other circumstances, these transitions may require user input or information retrieved from the user profile repository 125 to determine the next scene to be displayed. Accordingly, the logic used to determine scene selection is highly configurable and may be used to customize a presentation for a particular class of users, or for a single specific user.

Figure 2:
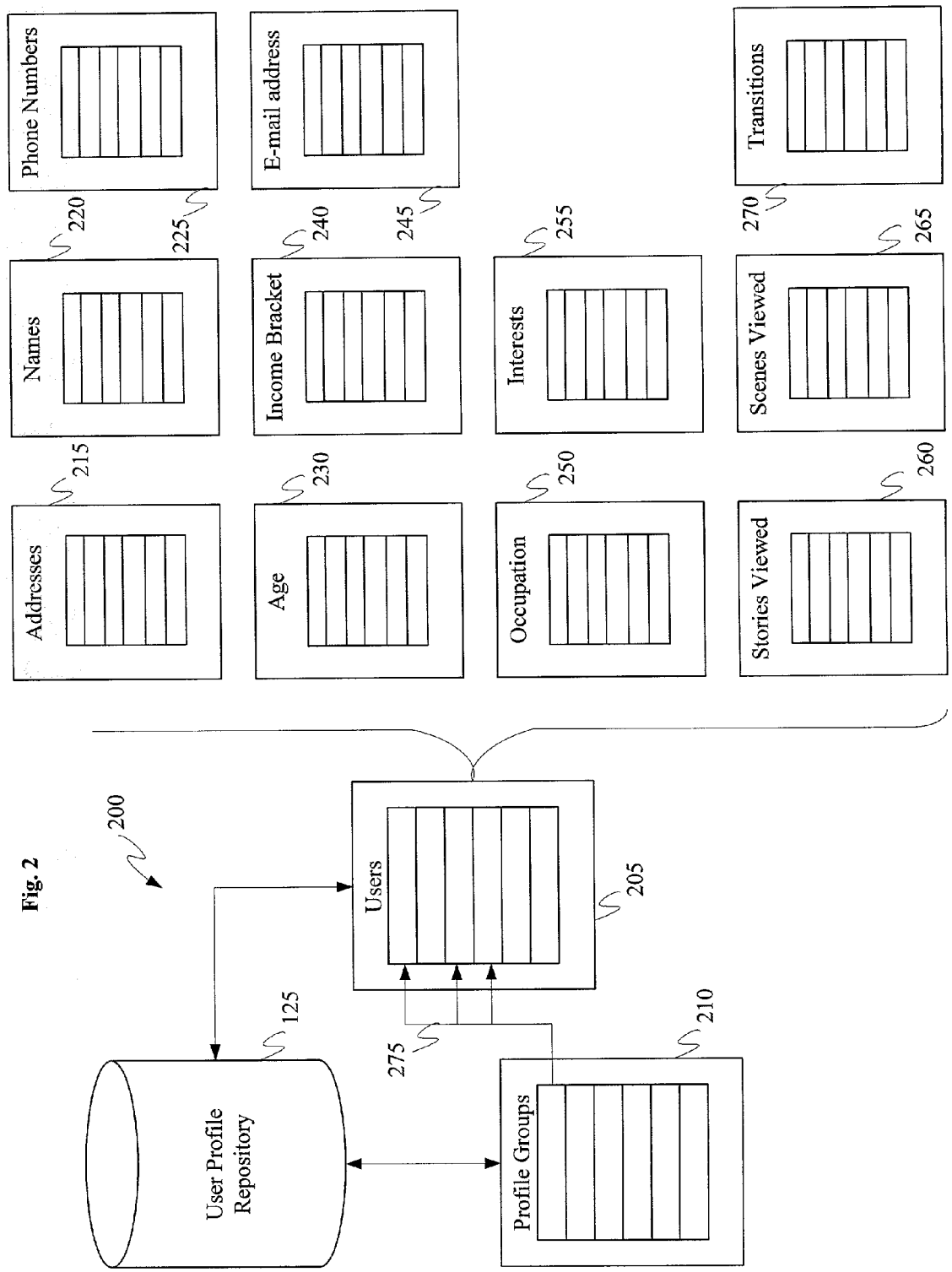
FIG. 2 is a block diagram illustrating tables of information that may be stored in a user profile repository as well as the relationship between these tables of data.

A block diagram depicting a representative example of a user profile repository 125 is illustrated in FIG. 2. In the embodiment illustrated in FIG. 2, information is stored in a relational database containing a variety of tables and fields. Two tables that may be utilized are a user table 205 and a profile groups table 210. Each user in the table of users 205 will be associated with a variety of data including, for example, address information 215, name information 220, phone number data 225, age data 230, income bracket 240, e-mail address 245, occupation 250, and personal interests 255. The list of tables depicted in FIG. 2 is for purposes of illustration only and is not meant to describe as an exhaustive list. Also associated with each user in the table of users 205 are data corresponding to presentations/stories that have been viewed by the user. This data may include a list of the stories viewed by the user 260, a list of the scenes viewed by the user 265 and a list of the transitions selected by the user 270. The profile groups table 210 contains a list of users that meet certain criteria 275. For example, a profile group may include a list of users that are over the age of 55 and have a personal interest in travel to Europe. Therefore, each user in the user list 205 that has information that meets this criteria would be a member of this profile group. Users that satisfy the predefined criteria would be added to corresponding profile group, as shown by reference numeral 275.

Figure 3:
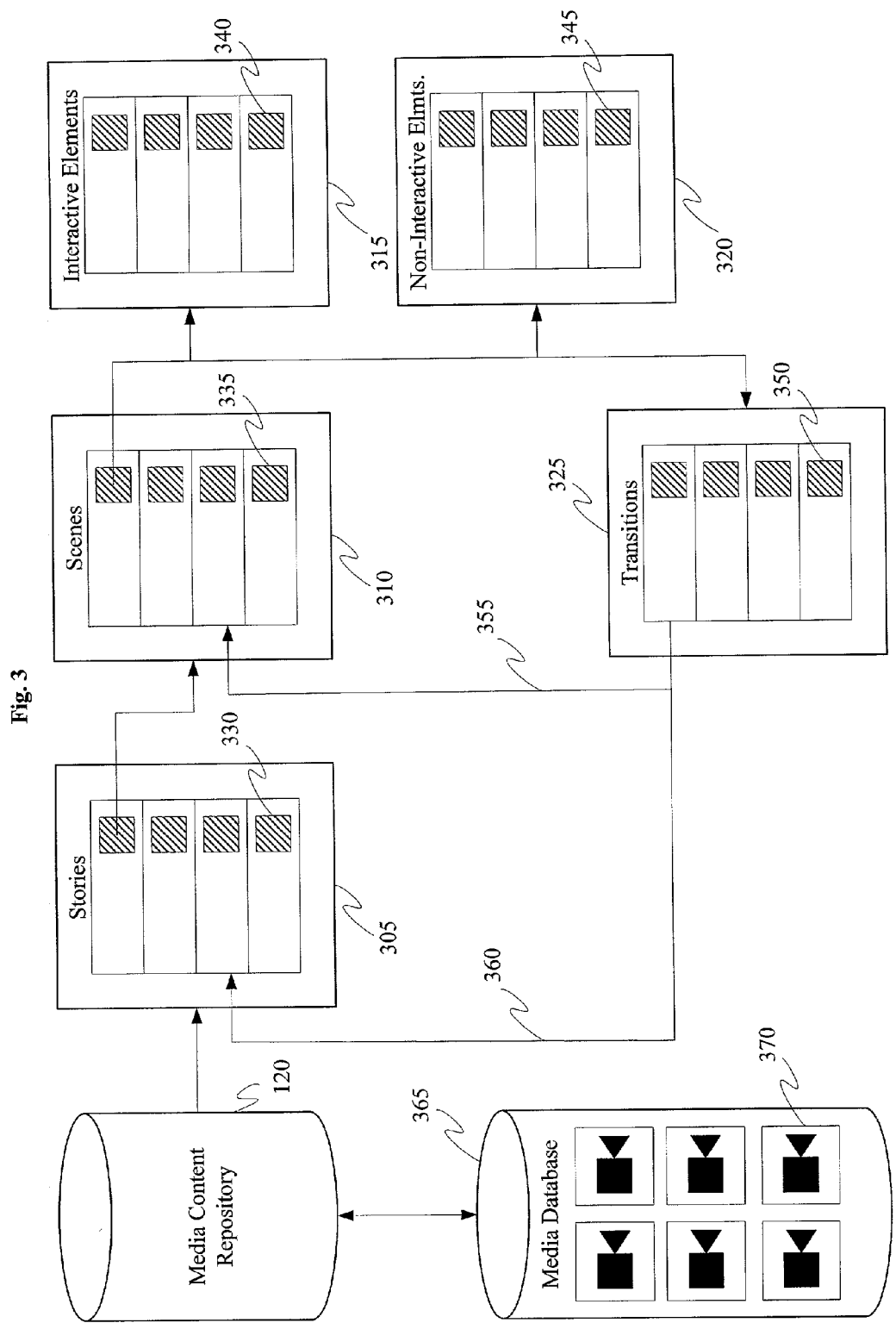
FIG. 3 is a block diagram illustrating the files that may be stored in the media content repository as well as the relationship between these files.

A block diagram depicting the information that is stored within the media content repository 120 is depicted in FIG. 3. In FIG. 3, a table of stories 305 (i.e. presentations) is stored within the media content repository 120. Each story is comprised of several elements including a list of scenes 310, a list of interactive elements 315, a list of non-interactive elements 320, and a list of transitions 325. Furthermore, each story will have metadata 330 associated with it. The metadata 330 will contain information that describes the contents of the story as well as other relevant information, such as pointers to specific media files. As described above, each story may be broken down into a list of individual scenes 310 that depict certain elements of the presentation. Each scene will also have metadata 335 associated with it that describe the contents of the individual scene as well as other relevant information, such as pointers to specific media files. Each individual scene is further comprised of a combination of three other elements: an interactive element 315, a non-interactive element 320, and a transition 325. As a minimum, each scene should include at least one interactive or non-interactive element and at least one transition. Many scenes, however, will include several different kinds of elements (interactive and non-interactive) along with a transition. Each interactive and non-interactive element may have metadata (340, 345) associated with it that describes the content or other information associated with that element, such as pointers to specific media files. Lastly, each transition will have metadata (350) associated with it that describes the options presented by the transition as well as other relevant information, such as pointers to specific media files. Each transition may include a reference to other scenes within the same story (355) or to an entirely different story (360) contained within the list of stories 305. Furthermore, there are at least four different kinds of transitions that may be stored within the list of transitions 325: an automatic transition, a user-profile driven transition, an interactive transition, and a user-profile/interactive transition. Each of these transitions will be further described below.

Also stored within the media content repository 120 is a media database 365, which may contain a wide variety of media files 370. These files may be pictures, video, audio, text, or any other kind of information that may be presented to a user on a client terminal 130. For example, one media file 370 may be a streaming video file that depicts a travel agent giving instruction on how to find the lowest fare for a particular airline ticket. Another media file 370 may contain a simple graphic banner that contains a company's brand name. Yet another media file 370 may be an audio file that contains music to be played to a user when he is watching a presentation. All of these media files are stored in specific locations so that they may be readily retrieved by the media server 110 when a presentation or story requires it.

Thus, by referring to FIG. 3, it can be seen that a typical story will contain a plurality of scenes, each of which may include a variety of interactive and non-interactive elements, and a transition. Each of the interactive and non-interactive elements will contain metadata pointing to files 370 that may be stored within the media database 365, or are located on the Internet, which may be retrieved by the media server 110 and presented to the user on his client terminal 130. Each scene will also have a corresponding transition that determines what scene/story should follow it.

Figure 4:
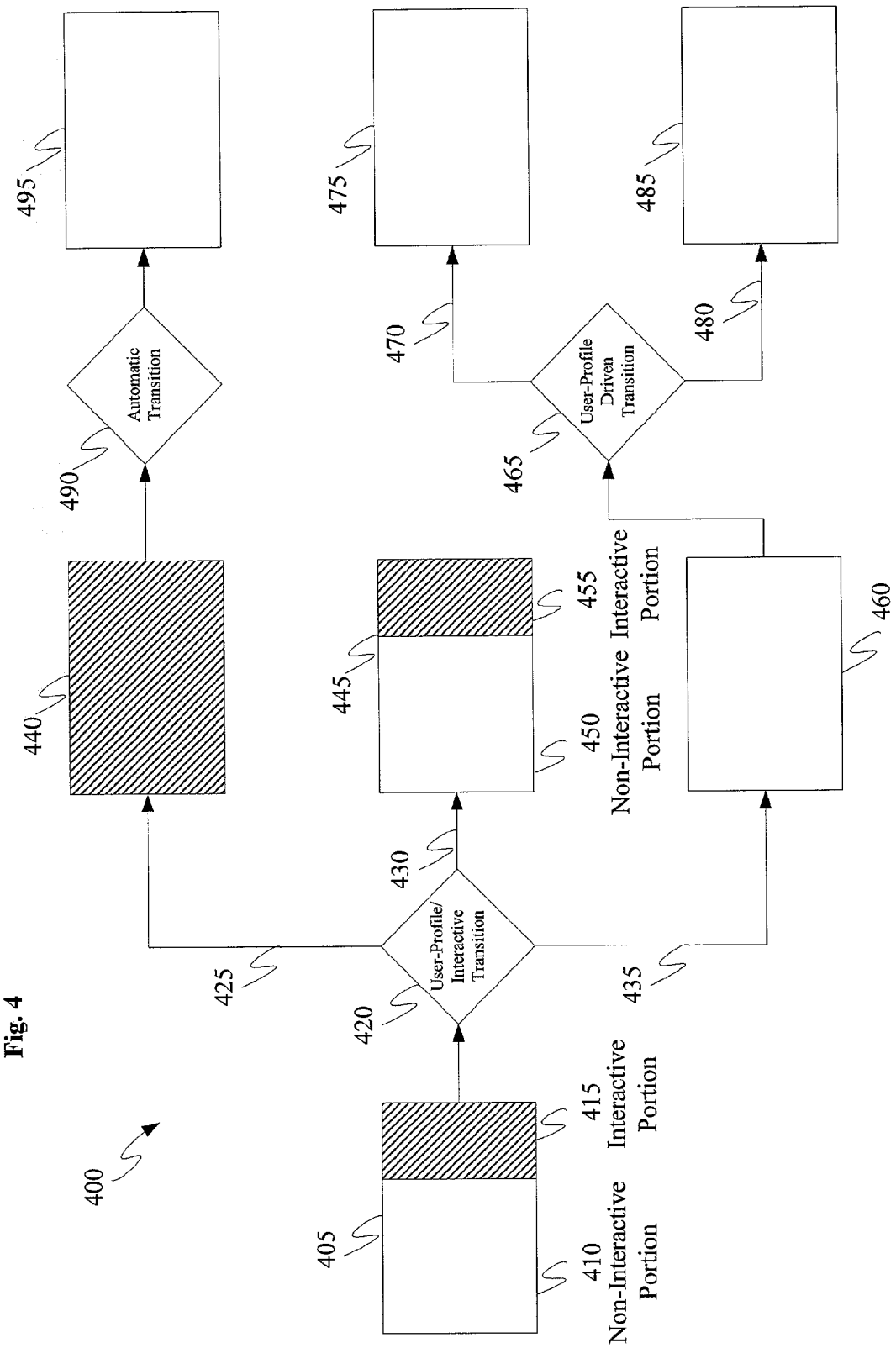
FIG. 4 is a flow chart depicting the structure and flow of a representative example of a story/content definition that is stored within the media content repository.

A block diagram depicting the process flow of a representative story/presentation is illustrated in FIG. 4. The flow of this diagram proceeds from left to right and starts with the first scene 405. In FIG. 4, it can be seen that the first scene 405 is comprised of a non-interactive portion 410 and an interactive portion 415. For example, scene 405 may be comprised of a display that illustrates four regions of the world of interest to a traveler. The portion of the display that includes maps and descriptions would be the non-interactive portion of the scene 410. On the other hand, the portion of the display that allows the user to select a region of the world to receive more extensive information about that region would be the interactive portion of the scene 415. After the first scene 405 has been presented, the story proceeds to a transition 420. For purposes of illustration, transition 420 is depicted as a user-profile/interactive transition. This transition therefore utilizes user input and information retrieved from the user's profile to determine which scene to play next. FIG. 4 depicts three options that are available at this transition—branch 425, branch 430 and branch 435. If branch 425 is selected, then scene 440 is presented to the user. In FIG. 4, it can be seen that scene 440 is comprised entirely of interactive elements. An example of a fully interactive scene would be a screen that prompts a user to provide certain information to the media server, such as dates for travel or answers to test questions. If branch 430 is selected, then scene 445 will be presented. Scene 445 is comprised of a non-interactive portion 450 and an interactive portion 455. On the other hand, if branch 435 is selected, then scene 460 will be presented to the user. Scene 460 is depicted in FIG. 4 as being comprised entirely of non-interactive elements. This may correspond to a streaming video segment that is being displayed to the user without requiring any input from the user. After scene 460 has been presented to the user, the story proceeds to transition 465, which is a user-profile driven transition. Thus, the determination of which scene to present after scene 460 is based entirely upon information that is stored within the user's profile in the user profile repository 125. At transition 465, if branch 470 is selected, then scene 475 will be presented to the user. If, however, branch 480 is selected, then scene 485 will be presented to the user.

Returning to scene 440, it can be seen that the next step in the presentation will be to proceed to the transition 490, which is depicted as an automatic transition. An automatic transition will select the next scene based solely upon information contained within the transition 490 itself. No information is solicited from the user and no information is retrieved from the user profile to determine the next scene. Accordingly, the story will automatically proceed directly to scene 495 after transition 490. In sum, FIG. 4 depicts some of the possible combinations of scenes and transitions that may comprise a presentation or story. A wide variety of combinations and permutations are possible so as to create rich content and provide a custom-tailored viewing experience for the user.

A process flow diagram depicting some of the steps utilized by one aspect of the invention is depicted in FIG. 5A. The process starts (500) by compiling a list of users that meet certain profile criteria 502. This step is performed by the profile server 150 of the media server 110. For example, it may be desirable to send a promotional presentation to certain individuals whose user profile indicates that they are married and have between 30,000 and 50,000 frequent flier miles. By analyzing the information stored in the user profile repository 125, the profile server 150 generates a list of users that meet this criteria. The next step is to provide notification to those users that a presentation is available to them 504. This notification can be provided in a variety of ways, such as through e-mail, a video mailbox, a watermark overlaid on current TV programming, a message light on a television set-top box, a beep on a cell phone or PDA, or any other suitable means. After being notified that a presentation is available, the user will transmit a request to view the presentation at his client terminal 130 (506). Upon receiving the request to view the presentation, the content server 145 will retrieve a content definition corresponding to the presentation from the media content repository 120 (508). As described earlier, a content definition is a framework that describes how a series of scenes, interactive elements, non-interactive elements, and transitions are to be presented to the user. The content definition will generally not include the media content files, but will instead contain references describing where to find those files. After retrieving the content definition from the media content repository 120, the media server 110 forwards it to the user's client terminal 130 (510). At the client's terminal 130, the content definition is rendered and processed so as to create a dynamic user interface that is displayed to the user on his client terminal 130 (512). This process requires the user terminal 130 to execute the content definition and determine which media content files are to be retrieved by the media server 110 (514). For purposes of illustration, it will be assumed that the first scene requires media content that is stored within the media content repository 120. The content server 145 retrieves the media content corresponding to the first scene from the media content repository 120 (516). This media content is then transmitted to the client terminal 130 so that the first scene may be assembled and displayed to the user (518). After the first scene has been displayed, the content definition proceeds to its first transition. As described above, the transition may utilize a variety of methods to select the next scene in the presentation. Four representative transitions are described below, any of which may be utilized in this invention.

A process flow diagram depicting an automatic transition is illustrated in FIG. 5B. This transition utilizes information contained within the content definition itself to determine the next scene to be displayed to the user (520). Accordingly, the client terminal 130 transmits a request for the content corresponding to the next scene to the media server 110 (522) without polling either the user or the user profile repository. The media server 110 retrieves the media content corresponding to the next scene from any of the available sources, including the media content repository 120, the user profile repository, a service provider 105 or the Internet (524). The media content corresponding to the next scene is then transmitted to the client terminal 130 so that it may be viewed by the user (526). At this point, the client terminal 130 will either process another transition (527) or terminate the presentation (528) depending upon the instructions contained in the content definition.

Figure 5C:
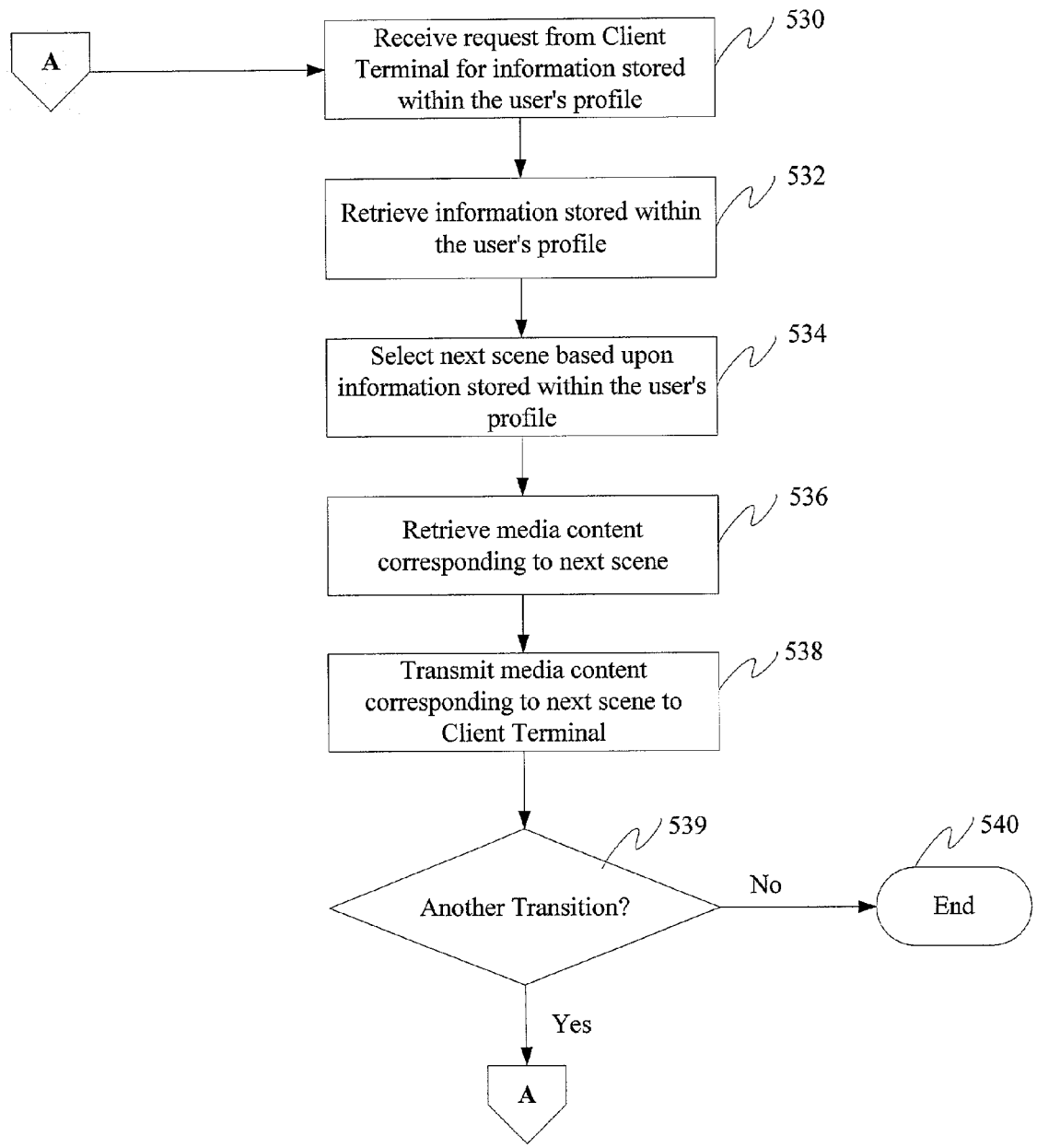
FIG. 5c is a process flow diagram illustrating how an user-profile driven transition is processed by the system.

A process flow diagram depicting a user-profile driven transition is illustrated in FIG. 5C. According to this transition, the client terminal 130 utilizes data stored within the user's profile to determine which scene should be presented next. Accordingly, the first step is to send a request to the media server 110 for information about the user that is stored within the user's profile (530). Upon receiving this request, the profile server 150 retrieves the requested information from the user profile repository 125 (532). This information is forwarded to the client terminal 130 where a decision is made, based upon logic within the content definition, as to which scene should be presented next (534). Upon determining which scene should be presented next, the client terminal 130 transmits a request to the media server 110 to retrieve media content corresponding to the next scene (536). As stated above, this media content may be retrieved from a variety of sources. After the media content has been retrieved, it is transmitted to the client terminal 130 where it is displayed to the user (538). At this point, the client terminal 130 will either process another transition (539) or terminate the presentation (540) depending upon the instructions contained in the content definition.

Figure 5D:
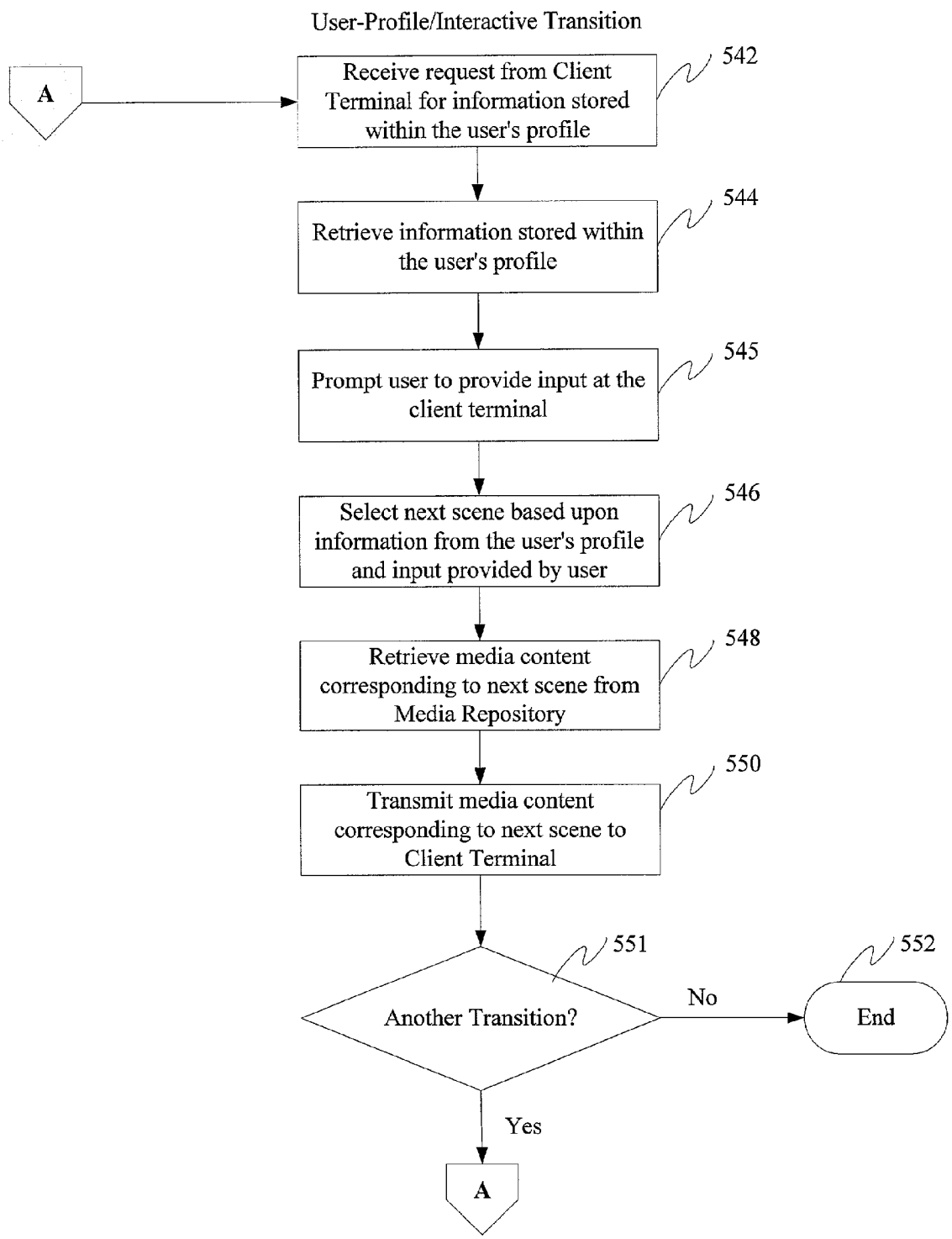
FIG. 5d is a process flow diagram illustrating how an user-profile/interactive transition is processed by the system.

A process flow diagram depicting a user-profile/interactive transition is illustrated in FIG. 5D. This transition selects a scene based upon input received from the user at the client terminal 130 and upon information contained within the user's profile in the user profile repository 125. To start, the client terminal 130 transmits a request to the media server 110 for information stored within the user's profile (542). The profile server 150 retrieves the requested information from the user profile repository 125 and transmits this information to the client terminal 130 (544). At approximately the same time, the client is prompted to provide input into the client terminal 130 to determine which scene should be presented next (545). According to one aspect of the invention, the options presented to the user at this point may be determined by information retrieved from the user's profile. For example, the user profile may contain information regarding the user's preferred airlines for travel arrangements. Thus, this transition may only present options that correspond to the user's preferred airlines for travel. Alternatively, the same options will be presented to the user regardless of the information retrieved from the user profile. In both of these alternatives, however, the transition utilizes information provided by the user and information retrieved from the profile to select the next scene to be viewed (546). Upon determining which scene should be presented next, the client terminal 130 transmits a request to the media server 110 to retrieve media content corresponding to the next scene (548). As stated above, this media content may be retrieved from a variety of sources. After the media content has been retrieved, it is transmitted to the client terminal 130 where it is displayed to the user (550). At this point, the client terminal 130 will either process another transition (551) or terminate the presentation (552) depending upon the instructions contained in the content definition.

A process flow diagram depicting an interactive transition is illustrated in FIG. 5E. This transition utilizes input received from the user at the client terminal 130 to determine the next scene to be presented to the user. According to this transition, a user will be prompted to provide input at the client terminal 130 (554). Next, the client terminal 130 selects the next scene to be presented based upon the input provided by the user (555). A request for media content corresponding to the next scene is forwarded to the media server 110 so that it may be retrieved from the appropriate locations. As stated above, this media content may be retrieved from a variety of sources (556). After the media content has been retrieved, it is transmitted to the client terminal 130 where it is displayed to the user (558). At this point, the client terminal 130 will either process another transition (559) or terminate the presentation (560), depending upon the instructions contained in the content definition.

Subsequent scenes may utilize any of the four transitions described and illustrated in FIGS. 5B, 5C, 5D or 5E. Indeed, the presentation may be configured as a continuous loop in which the user is directed to return to a "home" scene after the presentation of certain pre-defined scenes.

For purposes of illustration, the following FIGS. 6, 7, 8 & 9 depict screen shots that would be viewed by a user during an exemplary presentation. These screen shots are included for the purpose of illustration and do not limit the possible implementations of this invention.

Figure 6:
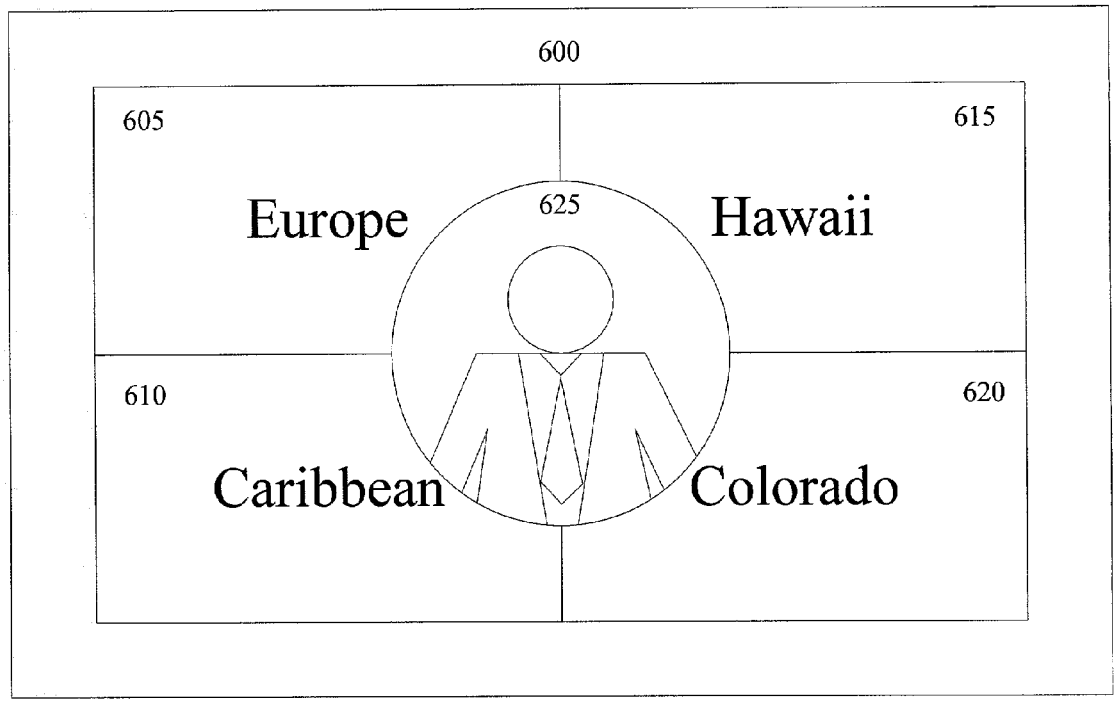
FIG. 6 is a first screen shot of a representative example of a presentation as seen by a user at a client terminal.

FIG. 6 is an exemplary screen shot of a scene 600 that would be viewed by a user at a client terminal 130 during a presentation on travel destinations. In FIG. 6, the screen is divided into five regions: a Europe window 605, a Caribbean window 610, a Hawaii window 615, a Colorado window 620, and a virtual agent window 625. Upon first viewing this scene, a user will see the four region windows (Europe (605), Caribbean (610), Hawaii (615) and Colorado (620)) and a virtual agent 625 that immediately begins describing the four different regions. The virtual agent is a streaming video presentation that is being streamed to the client terminal 130 by the media server 110. Although the virtual agent window 625 contains streaming video, it is not an interactive region in the display. Indeed, the user is not able to activate or select any additional information by clicking or selecting the virtual agent window 625. The four region windows (Europe (605), Caribbean (610), Hawaii (615) and Colorado (620)), however, are interactive regions. A user may obtain additional information about these regions by clicking or selecting the corresponding windows at the client terminal 130. Thus, window 600 can be considered as one scene with four interactive elements (the region windows) and one non-interactive element (the virtual agent). In addition, the scene utilizes an interactive transition because it relies solely on information provided by the user to determine the next scene to be displayed.

Figure 7:
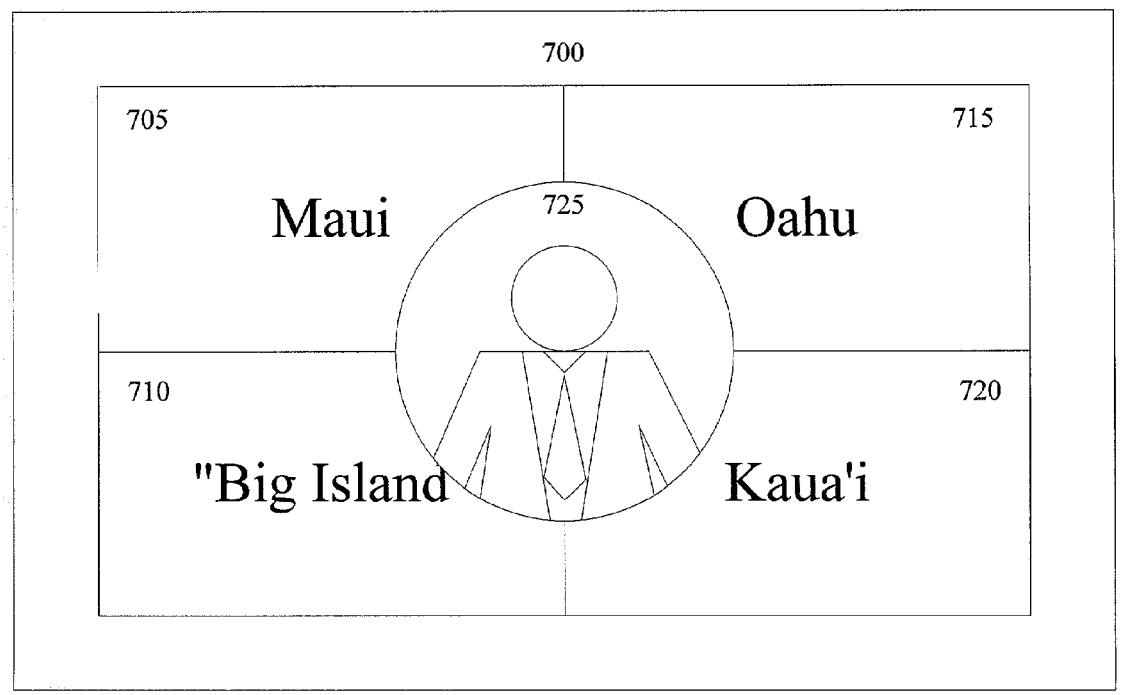
FIG. 7 is a second screen shot of a representative example of a presentation as seen by a user at a client terminal.

For purposes of illustration, it is assumed that the user selects Hawaii to receive more information about this region from the media server 110. The next scene that would be presented to the user is depicted in FIG. 7. Much like FIG. 6, FIG. 7 depicts a window 700 that is divided into five regions: a Maui window 705, a "Big Island" window 710, an Oahu window 715, a Kaua'i window 720, and a virtual agent window 725. Upon viewing this window, the virtual agent 725 immediately begins describing the four different Hawaiian islands. As in FIG. 6, the virtual agent is a streaming video presentation that is non-interactive. Similarly, the four region windows (Maui 705, "Big Island" 710, Oahu 715, and Kaua'i 720) are interactive regions. This window can be considered as one scene with four interactive elements (the region windows) and one non-interactive element (the virtual agent). In addition, this scene utilizes an interactive transition because it relies solely on information provided by the user to determine the next scene to be displayed.

Figure 8:
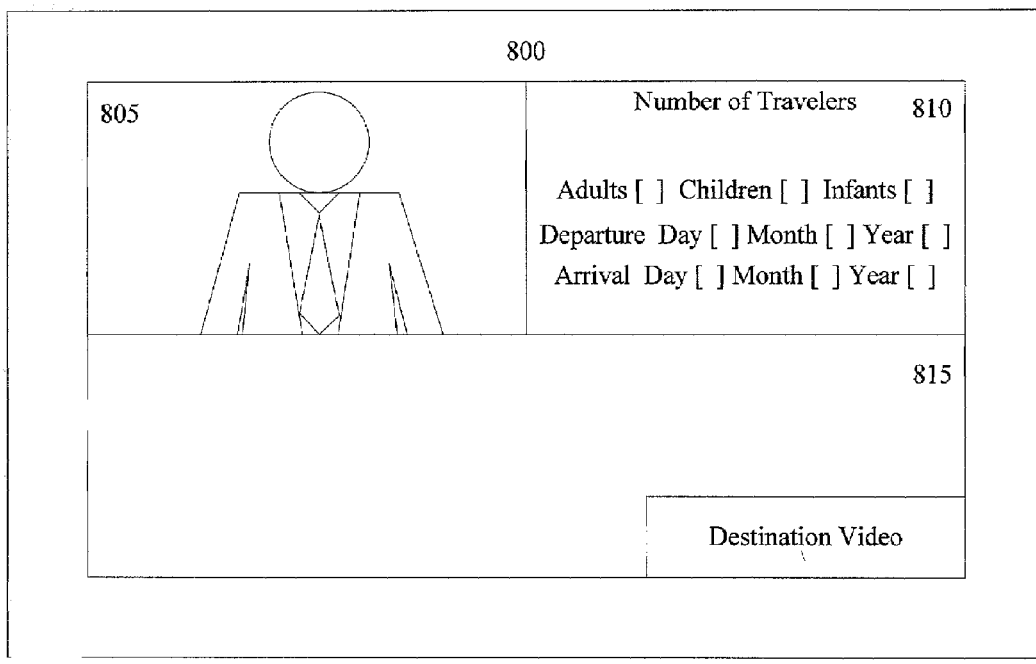
FIG. 8 is a third screen shot of a representative example of a presentation as seen by a user at a client terminal.

For purposes of illustration, it is assumed that the user selects Maui to receive more information about this island from the media server 110. At this point, the user will be presented with a scene similar to the one depicted in FIG. 8. The window in FIG. 8 (800) is comprised of three elements, a virtual agent window 805, an interactive web services window 810, and a destination video window 815. Much like FIG. 7, the virtual agent window 805 is a non-interactive element that describes Maui as a travel destination. The destination video window 815 is a non-interactive element that displays a streaming video segment that displays scenes from Maui. The interactive web services window 810 allows the user to retrieve and enter information about specific services associated with the destination. In FIG. 8, the interactive web services window 810 prompts the user for information about the number of travelers and departure dates. After providing the requested input, this information may be used to select certain airlines, hotels, or packages that would be suitable for the user. In addition, this window may utilize information retrieved from the user profile repository 125 in order to determine the next scene to be played. For example, the user may indicate that two adults and two children will be traveling. This information is combined with other information from the user's profile, such as a list of preferred airlines, to present a list of possible travel itineraries that utilize the preferred airline. According to this example, the interactive web services window 810 may utilize a user-profile/interactive transition to determine the next scene to be displayed.

Figure 9:
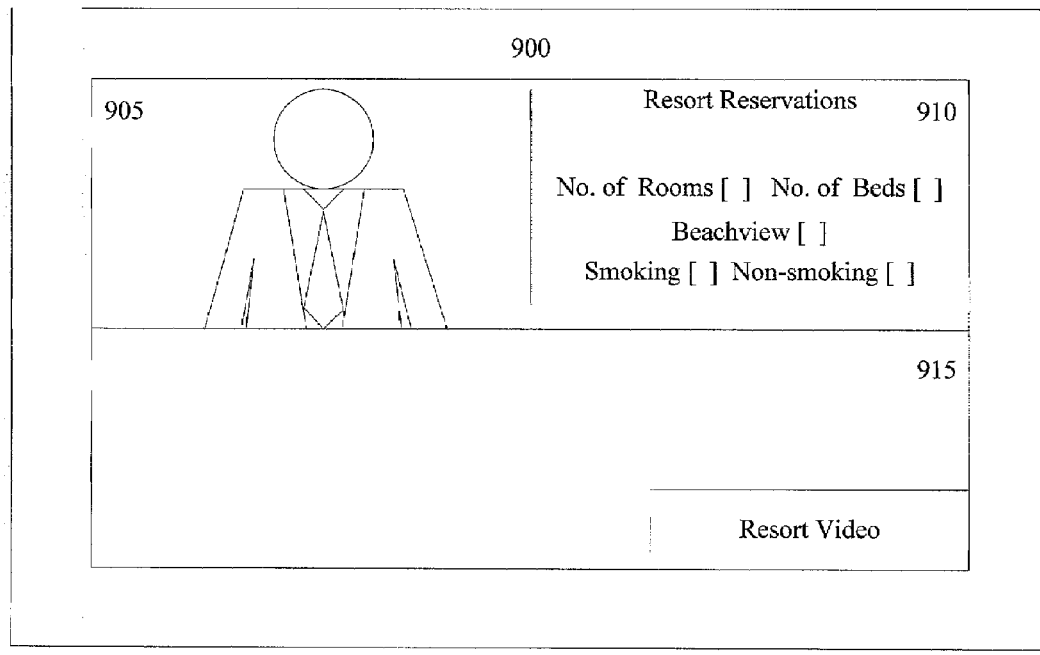
FIG. 9 is a fourth screen shot of a representative example of a presentation as seen by a user at a client terminal.

FIG. 9 is another exemplary screen shot of a scene 900 that would be viewed by a user at a client terminal 130 during the travel destination presentation. Similar to FIG. 8, the window in FIG. 9 (900) is comprised of three elements, a virtual agent window 905, an interactive web services window 910, and a resort video window 915. The virtual agent window 905 is a non-interactive element that displays a streaming video of a travel agent describing the resort that has been suggested as a travel destination. The destination video window 915 is a non-interactive element that displays a streaming video segment describing the resort. The interactive web services window 910 allows the user to retrieve and enter information about specific services associated with the resort. As this step may require information that is not stored within the media content repository 120, the media server 110 may poll one or more of the service providers 105 to obtain the necessary information to be displayed in the web services window 910. In FIG. 9, the web services window 910 prompts the user as to the kind of room that he/she desires at the resort. Upon receiving this information, the media server 110 interacts with one of the service providers 105 to determine if sufficient rooms are available at the desired resort.

By utilizing the scenes described above (FIGS. 6, 7, 8 & 9) as well as other scenes, the presentation may act as a centralized portal for obtaining information about the travel destinations, travel itineraries, and resort reservations.

Although various methods and systems have been described herein, one of ordinary skill in the art will recognize that the invention may be implemented in a variety of hardware, software, firmware, or in more specialized apparatuses constructed to perform the described processes. Further, as used herein, a "client" should be broadly construed to mean any computer or component thereof directly or indirectly connected or connectable in any known or later-developed manner to a computer network, such as the Internet. A "client" should also be broadly construed to mean one who requests or gets the file, and the "server" is the entity that downloads the file. Applicant intends that the claims shall not invoke the application of 35 U.S.C §112, ¶6 unless the claim is explicitly written in means-plus-step or means-plus-function format.

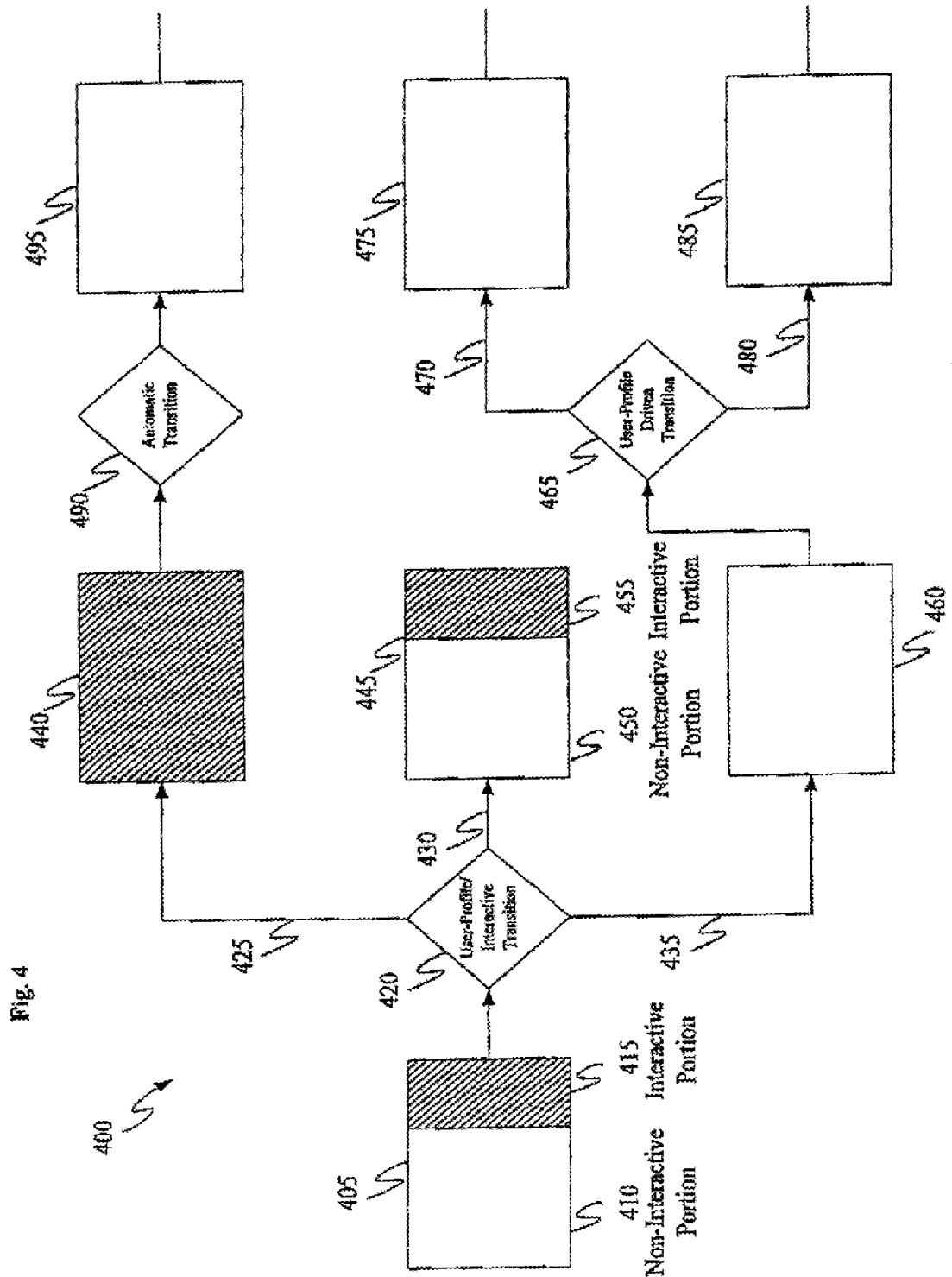

We claim:

1. A method for delivering an interactive media presentation to a client terminal comprising:

providing a computer system comprising i) a server, ii) a media repository comprising a computer memory encoded with at least one content definition and at least one media file, and iii) a user profile repository comprising a computer memory encoded with at least one user profile, wherein the server, the media repository and the user profile repository are electrically connected, and wherein the server is electrically connected to a computer network for communication with at least one client terminal;

receiving a request from a client terminal to provide an interactive media presentation to the client terminal;

retrieving a content definition corresponding to the requested interactive media presentation from the media content repository, wherein the content definition comprises at least one scene, wherein each of the scenes comprises at least one display element and a transition;

transmitting the retrieved content definition to the client terminal;

receiving a request from the client terminal for a first media file corresponding to a display element of a first scene in the content definition;

retrieving the first media file from the media repository;

transmitting the first media file to the client terminal;

receiving a request from the client terminal for a second media file corresponding to a display element of a second scene in the content definition, wherein the selection of the second scene is based upon the transition of the first scene;

retrieving the second media file from the media repository;

transmitting the second media file to the client terminal.

2. A method according to claim 1, wherein the transition of the first scene utilizes user profile information retrieved from the user profile repository to select the second scene to be displayed.

3. A method according to claim 2, further comprising:

receiving a request from the client terminal for user profile information stored within the user profile repository;

retrieving the requested user profile information from the user profile repository; and transmitting the requested user profile information to the client terminal.

4. A method according to claim 1, wherein the transition of the first scene utilizes interactive input provided by a user at the client terminal to select the second scene to be displayed.

5. A method according to claim 1, wherein the transition of the first scene utilizes interactive input provided by a user at the client terminal and user profile information retrieved from the user profile repository to select the second scene to be displayed.

6. A method according to claim 5, further comprising:
receiving a request from the client terminal for user profile information stored within the user profile repository;
retrieving the requested user profile information from the user profile repository; and
transmitting the requested user profile information to the client terminal.

7. A method according to claim 1, wherein the first scene comprises a plurality of non-interactive data elements and a plurality of interactive data elements.

8. A method according to claim 7, wherein the second scene comprises a plurality of non-interactive data elements and a plurality of interactive data elements.

9. A method according to claim 7, wherein each of the plurality of interactive data elements corresponds to a prospective second scene.

10. A method according to claim 9, further comprising:
receiving interactive input data provided by the user at the client terminal; and
storing the interactive input data in the user profile repository.

11. A method according to claim 1, wherein the first media file comprises a streaming video file.

12. A method according to claim 9, wherein the second media file comprises a streaming video file.

13. A method according to claim 1, wherein the client terminal comprises a personal computer.

14. A method according to claim 1, wherein the client terminal comprises a personal digital assistant.

15. A method according to claim 1, wherein the client terminal comprises a interactive television set-top box.

16. A method according to claim 1, wherein the client terminal comprises a cellular telephone.

17. A method according to claim 1, wherein the server utilizes an open-source processing platform.

18. A method according to claim 17, wherein the server utilizes a Java-based processing platform.

19. A method according to claim 1, further comprising:
generating a list of selected users by comparing each of the user profiles in the user profile repository with a set of selection criteria;
transmitting a notification describing the availability of an interactive media presentation to each of the users in the list of selected users.

20. A method according to claim 19, wherein the transmitting a notification further comprises sending an e-mail.

21. A method according to claim 19, wherein the transmitting a notification further comprises activating a message light on an interactive television set-top box.

22. A method for delivering an interactive media presentation to a client terminal comprising:
providing a computer system comprising i) a server, ii) a media repository comprising a computer memory encoded with at least one content definition and at least one media file, and iii) a user profile repository comprising a computer memory encoded with at least one user profile, wherein the server, the media repository and the user profile repository are electrically connected, and wherein the server is electrically connected to a computer network for communication with a web service provider and at least one client terminal;
receiving a request from a client terminal to provide an interactive media presentation to the client terminal;
retrieving a content definition corresponding to the requested interactive media presentation from the media content repository, wherein the content definition comprises at least one scene, wherein each of the scenes comprises at least one display element and a transition;
transmitting the retrieved content definition to the client terminal;
receiving a request from the client terminal for a first set of web services data corresponding to a display element of a first scene in the content definition;
retrieving the first set of web services data from the web services provider;
transmitting the first set of web services data to the client terminal;
receiving a request from the client terminal for a second set of web services data corresponding to a display element of a second scene in the content definition, wherein the selection of the second scene is based upon the transition of the first scene;
retrieving the second set of web services data from the media repository;
transmitting the second set of web services data to the client terminal.

23. A method according to claim 22, wherein the transition of the first scene utilizes user profile information retrieved from the user profile repository to select the second scene to be displayed.

24. A method according to claim 23, further comprising:
receiving a request from the client terminal for user profile information stored within the user profile repository;
retrieving the requested user profile information from the user profile repository; and
transmitting the requested user profile information to the client terminal.

25. A method according to claim 22, wherein the transition of the first scene utilizes interactive input provided by a user at the client terminal to select the second scene to be displayed.

26. A method according to claim 22, wherein the transition of the first scene utilizes interactive input provided by a user at the client terminal and user profile information retrieved from the user profile repository to select the second scene to be displayed.

27. A method according to claim 26, further comprising:
receiving a request from the client terminal for user profile information stored within the user profile repository;
retrieving the requested user profile information from the user profile repository; and
transmitting the requested user profile information to the client terminal.

28. A method according to claim 22, wherein the first scene comprises a plurality of non-interactive data elements and a plurality of interactive data elements.

29. A method according to claim 28, wherein the second scene comprises a plurality of non-interactive data elements and a plurality of interactive data elements.

30. A method according to claim 28, wherein each of the plurality of interactive data elements corresponds to a prospective second scene.

31. A method according to claim 30, further comprising:
receiving interactive input data provided by the user at the client terminal; and
storing the interactive input data in the user profile repository.

32. A method according to claim 28, wherein a non-interactive data element corresponds to a streaming video file.

33. A method according to claim 22, wherein the client terminal comprises a personal computer.

34. A method according to claim 22, wherein the client terminal comprises a personal digital assistant.

35. A method according to claim 22, wherein the client terminal comprises a interactive television set-top box.

36. A method according to claim 22, wherein the client terminal comprises a cellular telephone.

37. A method according to claim 22, wherein the server utilizes an open-source processing platform.

38. A method according to claim 37, wherein the server utilizes a Java-based processing platform.

39. A method according to claim 22, further comprising:
generating a list of selected users by comparing each of the user profiles in the user profile repository with a set of selection criteria;
transmitting a notification describing the availability of an interactive media presentation to each of the users in the list of selected users.

40. A method according to claim 39, wherein the transmitting a notification further comprises sending an e-mail.

41. A method according to claim 40, wherein the transmitting a notification further comprises activating a message light on an interactive television set-top box.

42. A computer system for delivering an interactive media presentation to a client terminal, the system comprising:
a computer server electrically connected to a computer network for communication with at least one client terminal;
a media repository electrically connected to the computer server, the media repository comprising a computer memory encoded with at least one content definition and at least one media file;
a user profile repository electrically connected to the computer server, the user profile repository comprising a computer memory encoded with at least one user profile;
a computer memory encoded with instructions for controlling the computer system to:
  receive a request from a client terminal to provide an interactive media presentation to the client terminal;
  retrieve a content definition corresponding to the requested interactive media presentation from the media content repository, wherein the content definition comprises at least one scene, wherein each of the scenes comprises at least one display element and a transition;
  transmit the retrieved content definition to the client terminal;
  receive a request from the client terminal for a first media file corresponding to a display element of a first scene in the content definition;
  retrieve the first media file from the media repository;
  transmit the first media file to the client terminal;
  receive a request from the client terminal for a second media file corresponding to a display element of a second scene in the content definition, wherein the selection of the second scene is based upon the transition of the first scene;
  retrieve the second media file from the media repository; and
  transmit the second media file to the client terminal.

43. A computer system according to claim 42, wherein the transition of the first scene utilizes user profile information retrieved from the user profile repository to select the second scene to be displayed.

44. A computer system according to claim 43, wherein the computer memory is further encoded with instructions for controlling the computer system to:
receive a request from the client terminal for user profile information stored within the user profile repository;
retrieve the requested user profile information from the user profile repository; and
transmit the requested user profile information to the client terminal.

45. A computer system according to claim 42, wherein the transition of the first scene utilizes interactive input provided by a user at the client terminal to select the second scene to be displayed.

46. A computer system according to claim 42, wherein the transition of the first scene utilizes interactive input provided by a user at the client terminal and user profile information retrieved from the user profile repository to select the second scene to be displayed.

47. A computer system according to claim 46, wherein the computer memory is further encoded with instructions for controlling the computer system to:
receive a request from the client terminal for user profile information stored within the user profile repository;
retrieve the requested user profile information from the user profile repository; and
transmit the requested user profile information to the client terminal.

48. A computer system according to claim 42, wherein the server utilizes an open-source processing platform.

49. A computer system according to claim 48, wherein the server utilizes a Java-based processing platform.

50. A computer system for delivering an interactive media presentation to a client terminal, the system comprising:
a computer server electrically connected to a computer network for communication with a web services provider and at least one client terminal;
a media repository electrically connected to the computer server, the media repository comprising a computer memory encoded with at least one content definition and at least one media file;
a user profile repository electrically connected to the computer server, the user profile repository comprising a computer memory encoded with at least one user profile;
a computer memory encoded with instructions for controlling the computer system to:
  receive a request from a client terminal to provide an interactive media presentation to the client terminal;
  retrieve a content definition corresponding to the requested interactive media presentation from the media content repository, wherein the content definition comprises at least one scene, wherein each of the scenes comprises at least one display element and a transition;
  transmit the retrieved content definition to the client terminal;
  receive a request from the client terminal for a first set of web services data corresponding to a display element of a first scene in the content definition;
  retrieve the first set of web services data from the web services provider;
  transmit the first set of web services data to the client terminal;

receive a request from the client terminal for a second set of web services data corresponding to a display element of a second scene in the content definition, wherein the selection of the second scene is based upon the transition of the first scene;

retrieve the second set of web services data from the media repository; and transmit the second set of web services data to the client terminal.

51. A computer system according to claim 50, wherein the transition of the first scene utilizes user profile information retrieved from the user profile repository to select the second scene to be displayed.

52. A computer system according to claim 51, wherein the computer memory is further encoded with instructions for controlling the computer system to:

receive a request from the client terminal for user profile information stored within the user profile repository;

retrieve the requested user profile information from the user profile repository; and transmit the requested user profile information to the client terminal.

53. A computer system according to claim 50, wherein the transition of the first scene utilizes interactive input provided by a user at the client terminal to select the second scene to be displayed.

54. A computer system according to claim 50, wherein the transition of the first scene utilizes interactive input provided by a user at the client terminal and user profile information retrieved from the user profile repository to select the second scene to be displayed.

55. A computer system according to claim 54, wherein the computer memory is further encoded with instructions for controlling the computer system to:

receive a request from the client terminal for user profile information stored within the user profile repository;

retrieve the requested user profile information from the user profile repository; and transmit the requested user profile information to the client terminal.

56. A computer system according to claim 50, wherein the server utilizes an open-source processing platform.

57. A computer system according to claim 56, wherein the server utilizes a Java-based processing platform.

* * * * *

UNITED STATES PATENT AND TRADEMARK OFFICE
CERTIFICATE OF CORRECTION

| | | |
|---|---|---|
| PATENT NO. | : 7,114,170 B2 | Page 1 of 2 |
| APPLICATION NO. | : 10/068402 | |
| DATED | : September 26, 2006 | |
| INVENTOR(S) | : Doug S. Harris et al. | |

It is certified that error appears in the above-identified patent and that said Letters Patent is hereby corrected as shown below:

Delete Drawing Sheet 4 of 11 and substitute therefore the attached Drawing Sheet 4 of 11.

Signed and Sealed this

Twenty-second Day of July, 2008

JON W. DUDAS
*Director of the United States Patent and Trademark Office*